United States Patent
Liu et al.

(10) Patent No.: US 9,183,669 B2
(45) Date of Patent: Nov. 10, 2015

(54) METHOD AND APPARATUS FOR VIRTUAL VIEWPOINT SYNTHESIS IN MULTI-VIEWPOINT VIDEO

(75) Inventors: Ju Liu, Shandong (CN); Lu Wang, Shandong (CN); Jiande Sun, Shandong (CN); Wei Liu, Shandong (CN)

(73) Assignees: HISENSE CO., LTD., Shandong (CN); Hisense USA Corporation, Suwanee, GA (US)

( * ) Notice: Subject to any disclaimer, the term of this patent is extended or adjusted under 35 U.S.C. 154(b) by 57 days.

(21) Appl. No.: 14/342,366

(22) PCT Filed: Sep. 7, 2012

(86) PCT No.: PCT/CN2012/081139
§ 371 (c)(1),
(2), (4) Date: Feb. 28, 2014

(87) PCT Pub. No.: WO2013/034101
PCT Pub. Date: Mar. 14, 2013

(65) Prior Publication Data
US 2015/0221126 A1 Aug. 6, 2015

(30) Foreign Application Priority Data
Sep. 9, 2011 (CN) .......................... 2011 1 0267778

(51) Int. Cl.
*G06K 9/36* (2006.01)
*G06T 15/20* (2011.01)
(Continued)

(52) U.S. Cl.
CPC . *G06T 15/20* (2013.01); *G06T 3/00* (2013.01); *G06T 7/0051* (2013.01)

(58) Field of Classification Search
USPC ......... 382/276, 154, 204, 300; 348/14.07, 42, 348/43, 47, 51, E13.001; 345/419, 581, 345/582; 600/437, 439, 595
See application file for complete search history.

(56) References Cited

U.S. PATENT DOCUMENTS 6,750,873 B1 *  6/2004  Bernardini et al. ........... 345/582
8,423,596 B2 *  4/2013  Gifford .......................... 708/401
(Continued)

FOREIGN PATENT DOCUMENTS

CN  101309411 A  11/2008
CN  101309412 A  11/2008
(Continued)

OTHER PUBLICATIONS

Lu Wang et al., "Virtual View Synthesis Without Preprocessing Depth Image for Depth Image Based Rendering", 3D TV Conference 2011, 2011, IEEE.
(Continued)

*Primary Examiner* — Anh Do

(57) ABSTRACT

Disclosed are a virtual viewpoint combination method and device in a multi-viewpoint video, improving the quality of the virtual viewpoint images and improving the display effects of the virtual viewpoint images under the premise of not introducing geometrical distortion. The method includes: taking two viewpoint images provided by a first camera and a second camera as reference viewpoint images, and respectively performing 3D image conversion, pinhole filling, image compensation and image convergence processing on the two viewpoint images to obtain a main virtual viewpoint image; then respectively performing depth-image processing, 3D image conversion, pinhole filling, image compensation and image convergence processing on the two viewpoint images to obtain a subordinate virtual viewpoint image; and performing filling the remaining holes in the main virtual viewpoint image on the basis of the subordinate virtual viewpoint image to obtain a final virtual viewpoint image to be combine.

10 Claims, 11 Drawing Sheets

(51) Int. Cl.
  *G06T 7/00* (2006.01)
  *G06T 3/00* (2006.01)

(56) References Cited

U.S. PATENT DOCUMENTS

| | | | |
|---|---|---|---|
| 8,629,899 B2 * | 1/2014 | Raveendran et al. | 348/43 |
| 8,771,188 B2 * | 7/2014 | Schers et al. | 600/437 |
| 8,878,912 B2 * | 11/2014 | Raveendran et al. | 348/51 |
| 2011/0148858 A1 | 6/2011 | Ni et al. | |
| 2011/0157229 A1 | 6/2011 | Ni et al. | |

FOREIGN PATENT DOCUMENTS

| | | |
|---|---|---|
| CN | 102138333 A | 7/2011 |
| CN | 102138334 A | 7/2011 |
| CN | 102325259 A | 1/2012 |

OTHER PUBLICATIONS

International Search Report for PCT/CN2012/081139 filed on Sep. 7, 2012.

\* cited by examiner

METHOD AND APPARATUS FOR VIRTUAL VIEWPOINT SYNTHESIS IN MULTI-VIEWPOINT VIDEO

The present application is a US National Stage of International Application No. PCT/CN2012/081139, filed 7 Sep. 2012, designating the United States, and claiming priority to Chinese Patent Application No. 201110267778.5, filed with the Chinese Patent Office on Sep. 9, 2011 and entitled "Method and apparatus for virtual viewpoint synthesis in multi-viewpoint video", which is hereby incorporated by reference in its entirety.

FIELD OF THE INVENTION

The present invention relates to the technical fields of three-dimension video and processing a multimedia signal and particularly to a method and apparatus for virtual viewpoint synthesis in a multi-viewpoint video.

BACKGROUND OF THE INVENTION

Along with the development of television technologies and multimedia processing technologies, people have an increasing demand for the most realistic visual experience, and three-dimension televisions are regarded as the next generation of products subsequent to color televisions and high-definition televisions. With the principle that a person observes an object with his or her eyes at slightly different angles and thus can discern how far the object is away and obtain a stereo vision, a three-dimension television separates images as seen by the left and right eyes from each other so that the user can experience a stereo perception with his or her naked eyes without any stereo glasses. Particularly multi-viewpoint videos are ascertained to have a very wide application prospect, and virtual viewpoint synthesis in the multi-viewpoint videos is a key technology.

At present, depth image based rendering is a method for synthesizing virtual viewpoints using a reference viewpoint image and corresponding depth information, and this method has gained increasing attention and applications in recent years due to its good encoding efficiency, two-dimension/three-dimension selectivity and user interactivity. However, this method still suffers from the following drawback: an area which shall be visible at a virtual viewpoint is obscured at an original viewpoint, that is, an object or a background present in a virtual viewpoint image (hereinafter an area where the object or the background is present is referred to as an exposed area) is absent at a corresponding location in an original image, and information about the exposed area is absent in the original image, so the exposed area is a hole. The hole is embodied by a boundary with a sudden change in gray scale value in a depth image, so the hole has to be filled if the image quality of the virtual viewpoint needs to be improved.

At present, in order to improve the image quality of the virtual viewpoint and generate a resulting image with an optimum stereo effect, in a general approach to address the problem of a hole, depth image preprocessing is performed on the original image before three-dimension image transformation is performed on the original image to make a sharp sudden change in grade scale value in the depth image of the original image become smooth and further alleviate the difference in depth between a foreground object and a background to thereby lower the number of holes in the virtual viewpoint image and improve the quality of the view. Although this approach improves the quality of the virtual viewpoint image to some extent, depth image preprocessing may result in unrecoverable serious geometrical distortion of the virtual viewpoint image.

SUMMARY OF THE INVENTION

In view of the technical problem in the prior art, embodiments of the invention provide a method and apparatus for virtual viewpoint synthesis in a multi-viewpoint video to improve the quality of a virtual viewpoint image and enhance the display effect of the virtual viewpoint image taking into full account the relationship between depth image preprocessing and the high or low quality of the virtual viewpoint image to be synthesized in the end without resulting in any geometrical distortion.

A method for virtual viewpoint synthesis in a multi-viewpoint video includes:

the step 1 of performing three-dimension image transformation on a first reference viewpoint image obtained by a first camera according to the first reference viewpoint image and its depth image, and parameters of the first camera, to obtain a first virtual viewpoint image and its depth image and hole map; and performing three-dimension image transformation on a second reference viewpoint image obtained by a second camera according to the second reference viewpoint image and its depth image, and parameters of the second camera, to obtain a second virtual viewpoint image and its depth image and hole map;

the step 2 of filling small holes of the first virtual viewpoint image through horizontal, vertical and diagonal extrapolations according to the hole map of the first virtual viewpoint image, to obtain the small holes-filled first virtual viewpoint image; and filling small holes of the second virtual viewpoint image through horizontal, vertical and diagonal extrapolations according to the hole map of the second virtual viewpoint image, to obtain the small holes-filled second virtual viewpoint image;

the step 3 of performing image complementing by taking the small holes-filled first virtual viewpoint image and second virtual viewpoint image as reference images of each other, to obtain the image-complemented first virtual viewpoint image and second virtual viewpoint image;

the step 4 of performing fusion processing on the image-complemented first virtual viewpoint image and second virtual viewpoint image, to obtain a primary virtual viewpoint image;

the step 5 of performing depth image processing respectively on the first reference viewpoint image and the second reference viewpoint image, to obtain the depth image-processed first reference viewpoint image and second reference viewpoint image; and then performing the corresponding processes on the depth image-processed first reference viewpoint image and second reference viewpoint image according to the step 1 to the step 4, to obtain a secondary virtual viewpoint image; and the step 6 of filling holes of the primary virtual viewpoint image according to the secondary virtual viewpoint image to generate a virtual viewpoint image.

An apparatus for virtual viewpoint synthesis in a multi-viewpoint video includes:

a three-dimension image transforming unit configured to perform three-dimension image transformation on a first reference viewpoint image obtained by a first camera according to the first reference viewpoint image and its depth image, and parameters of the first camera to obtain a first virtual viewpoint image and its depth image and hole map; and to perform three-dimension image transformation on a second reference viewpoint image obtained by a second camera according to the second reference viewpoint image and its depth image, and parameters of the second camera to obtain a second virtual viewpoint image and its depth image and hole map;

a hole filling unit configured to fill small holes of the first virtual viewpoint image through horizontal, vertical and diagonal extrapolations according to the hole map of the first virtual viewpoint image to obtain the small holes-filled first virtual viewpoint image; and to fill small holes of the second virtual viewpoint image through horizontal, vertical and diagonal extrapolations according to the hole map of the second virtual viewpoint image to obtain the small holes-filled second virtual viewpoint image;

an image complementing unit configured to perform image complementing by taking the small holes-filled first virtual viewpoint image and second virtual viewpoint image as reference images of each other to obtain the image-complemented first virtual viewpoint image and second virtual viewpoint image;

an image fusion unit configured to perform fusion processing on the image-complemented first virtual viewpoint image and second virtual viewpoint image to obtain a primary virtual viewpoint image;

an depth image processing unit configured to perform depth image processing respectively on the first reference viewpoint image and the second reference viewpoint image to obtain the depth image-processed first reference viewpoint image and second reference viewpoint image; and to trigger the three-dimension image transforming unit, the hole filling unit, the image complementing unit and the image fusion unit to sequentially perform the corresponding processes on the depth image-processed first reference viewpoint image and second reference viewpoint image to obtain a secondary virtual viewpoint image; and a virtual viewpoint image generating unit configured to fill holes of the primary virtual viewpoint image according to the secondary virtual viewpoint image to generate a virtual viewpoint image.

In the embodiment of the invention, two viewpoint images provided by a first camera and a second camera are taken as reference viewpoint images, and three-dimension image transformation, small-hole filling, image complementing and image fusion processing are performed respectively on these two viewpoint images to obtain a primary virtual viewpoint image; then depth image processing, three-dimension image transformation, small-hole filling, image complementing and image fusion processing are performed respectively on the two viewpoint images to obtain a secondary virtual viewpoint image; and a virtual viewpoint image to be synthesized in the end is obtained by filling remaining holes of the primary virtual viewpoint image according to the secondary virtual viewpoint image. With the technical solution of the invention, the primary virtual viewpoint image is obtained by performing the corresponding processes on the two reference viewpoint images without any depth image processing, so no significant image distortion will result; and the secondary virtual viewpoint image is obtained by performing the corresponding processes, including depth image processing, on the two reference viewpoint images, so the difference in depth between a foreground object and a background can be alleviated and the quality of the virtual viewpoint image can be improved; and the virtual viewpoint image with a high quality can be synthesized without any distortion by filling the holes of the primary virtual viewpoint image according to the secondary virtual viewpoint image.

DETAILED DESCRIPTION OF THE EMBODIMENTS

In view of the technical problem in the prior art, embodiments of the invention provide a method and apparatus for virtual viewpoint synthesis in a multi-viewpoint video to improve the quality of a virtual viewpoint image and enhance the display effect of the virtual viewpoint image without resulting in any geometrical distortion. The method for virtual viewpoint synthesis in a multi-viewpoint video includes: two viewpoint images provided by a first camera and a second camera are taken as reference viewpoint images, and three-dimension image transformation, small-hole filling, image complementing and image fusion processing are performed respectively on these two viewpoint images to obtain a primary virtual viewpoint image; then depth image processing, three-dimension image transformation, small-hole filling, image complementing and image fusion processing are performed respectively on the two viewpoint images to obtain a secondary virtual viewpoint image; and a virtual viewpoint image to be synthesized in the end is obtained by filling remaining holes of the primary virtual viewpoint image according to the secondary virtual viewpoint image. With the technical solution of the invention, the primary virtual viewpoint image is obtained by performing the corresponding processes on the two reference viewpoint images without any depth image processing, so no significant image distortion will result; and the secondary virtual viewpoint image is obtained by performing the corresponding processes, including depth image processing, on the two reference viewpoint images, so the difference in depth between a foreground object and a background can be alleviated and the quality of the virtual viewpoint image can be improved; and the virtual viewpoint image with a high quality can be synthesized without any distortion by filling the holes of the primary virtual viewpoint image according to the secondary virtual viewpoint image.

The technical solution of the invention will be described below in details with reference to the drawings.

Figure 1A:
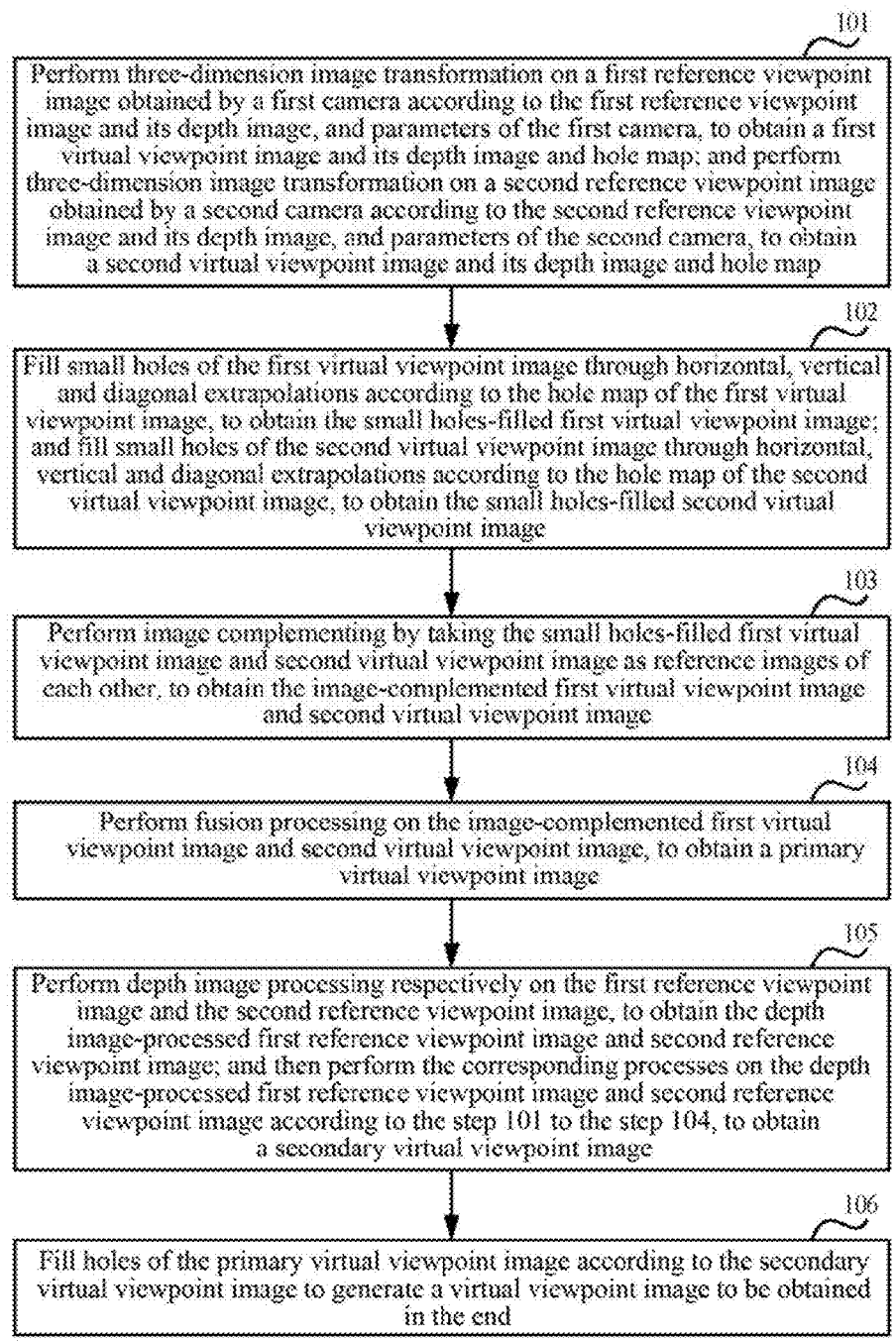
FIG. 1A is a flow chart of a method for virtual viewpoint synthesis in a multi-viewpoint video in an embodiment of the invention.
Figure 1B:
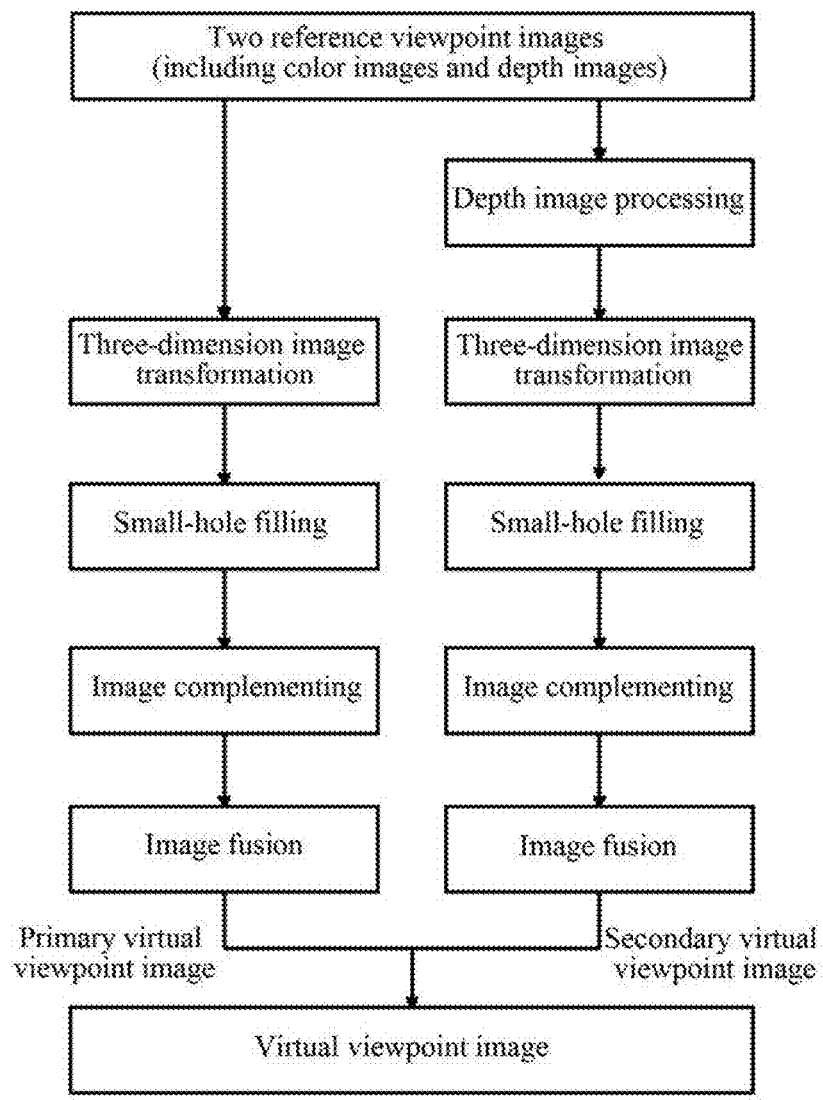
FIG. 1B is a schematic diagram of the flow illustrated in FIG. 1A.

Referring to FIG. 1A, which is a flow chart of a method for virtual viewpoint synthesis in a multi-viewpoint video in an embodiment of the invention, which can be further schematically illustrated in FIG. 1B, the method includes the following steps.

The step 101 is to perform three-dimension image transformation on a first reference viewpoint image obtained by a first camera according to the first reference viewpoint image and its depth image, and parameters of the first camera, to obtain a first virtual viewpoint image and its depth image and hole map; and to perform three-dimension image transformation on a second reference viewpoint image obtained by a second camera according to the second reference viewpoint image and its depth image, and parameters of the second camera, to obtain a second virtual viewpoint image and its depth image and hole map.

Particularly, the first camera and the second camera take images of the same picture to obtain the first reference viewpoint image and its depth image and the second reference viewpoint image and its depth image.

The step 102 is to fill small holes of the first virtual viewpoint image through horizontal, vertical and diagonal extrapolations according to the hole map of the first virtual viewpoint image, to obtain the small holes-filled first virtual viewpoint image; and to fill small holes of the second virtual viewpoint image through horizontal, vertical and diagonal extrapolations according to the hole map of the second virtual viewpoint image, to obtain the small holes-filled second virtual viewpoint image.

The step 103 is to perform image complementing by taking the small holes-filled first virtual viewpoint image and second virtual viewpoint image as reference images of each other, to obtain the image-complemented first virtual viewpoint image and second virtual viewpoint image.

The step 104 is to perform fusion processing on the image-complemented first virtual viewpoint image and second virtual viewpoint image, to obtain a primary virtual viewpoint image.

The step 105 is to perform depth image processing respectively on the first reference viewpoint image and the second reference viewpoint image, to obtain the depth image-processed first reference viewpoint image and second reference viewpoint image; and then perform the corresponding processes on the depth image-processed first reference viewpoint image and second reference viewpoint image according to the step 101 to the step 104, to obtain a secondary virtual viewpoint image.

The step 106 is to fill holes of the primary virtual viewpoint image according to the secondary virtual viewpoint image to generate a virtual viewpoint image to be obtained in the end.

In the step 101 of the foregoing flow, three-dimension image transformation can be performed on the first reference viewpoint image in the following steps:

The step a1 is to map pixels in the first reference viewpoint image into a three-dimension space, for which reference can be made to Formula (1);

The step b1 is to re-project the pixels mapped into the three-dimension space in the step a1 onto the first virtual viewpoint image, for which reference can be made to Formula (2); and The step c1 is to screen coordinate values of the pixels in the first virtual viewpoint image which is pixel re-projected in the step b1 through Z-fuffer and rounding method.

Three-dimension image transformation can be performed on the second reference viewpoint image in the following steps:

The step a2 is to map pixels in the second reference viewpoint image into the three-dimension space, for which reference can be made to Formula (3);

The step b2 is to re-project the pixels mapped into the three-dimension space in the step a2 onto the second virtual viewpoint image, for which reference can be made to Formula (4); and The step c2 is to screen coordinate values of the pixels in the second virtual viewpoint image which is pixel re-projected in the step b2 through Z-fuffer and rounding method.

In the step a1, the step b1 and the step c1, coordinate points of the pixels in the first reference viewpoint image are located in an image coordinate system with the upper left of the first reference viewpoint image being the origin, the horizontal direction being the abscissa and the vertical direction being the ordinate; and in the step a2, the step b2 and the step c2, coordinate points of the pixels in the second reference viewpoint image are located in an image coordinate system with the upper left of the second reference viewpoint image being the origin, the horizontal direction being the abscissa and the vertical direction being the ordinate.

Figure 2:
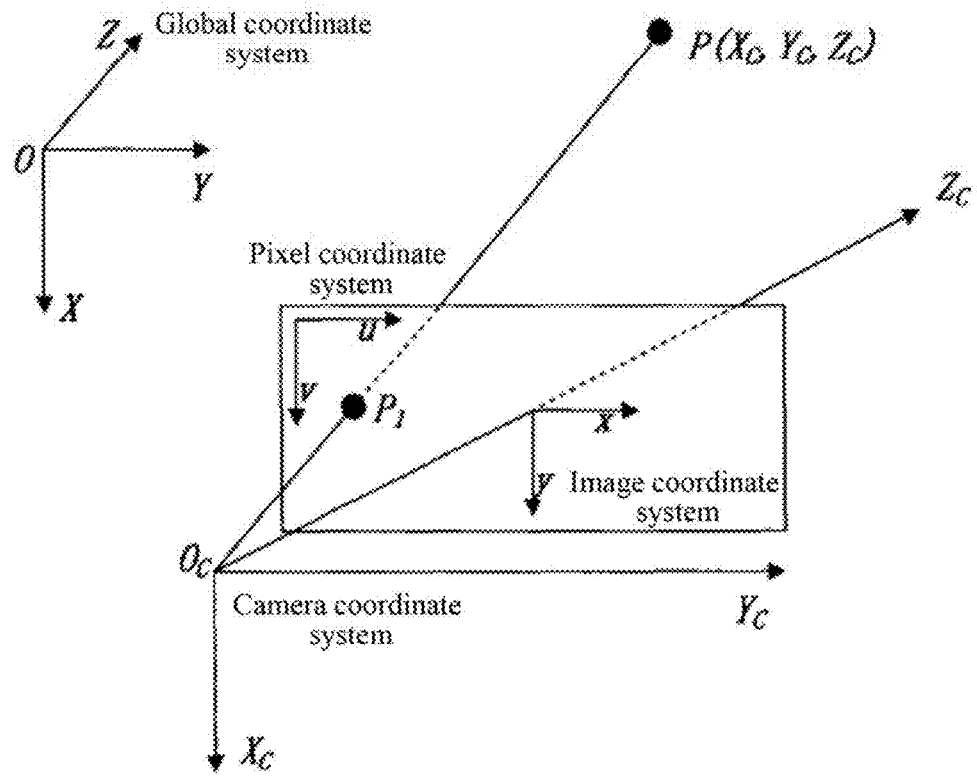
FIG. 2 is a diagram of a mapping relationship between an image coordinate system and a three-dimension space coordinate system in an embodiment of the invention.

A space coordinate system of the three-dimension space has the bottom left of a screen being the origin, and the vertical direction of the screen plane being the x axis of the space coordinate system and the horizontal direction of the screen plane being the y axis thereof. A mapping relationship between the image coordinate system and the space coordinate system may be as illustrated in FIG. 2.

The pixels in the first reference viewpoint image can be mapped into the three-dimension space by being transformed in Formula (1):

$$\tilde{m}_1 \cong A_1 P_n \tilde{M}_1 \quad \text{Formula (1);}$$

In Formula (1), $\tilde{m}_1$, is coordinates, in the image coordinate system, of a pixel in the first reference viewpoint image in a homogeneous coordinate system, $\tilde{M}_1$ is coordinates, in the three-dimension space coordinate system, of the pixel transformed into the three-dimension space in the homogeneous coordinate system; $A_1$ is a corresponding internal parameter matrix of the 2# camera; and $P_n$ is a normalized perspective projection matrix.

The pixels of the first reference viewpoint image mapped into the three-dimension space can be re-projected onto a target virtual viewpoint image, i.e., the first virtual viewpoint image, by being transformed in Formula (2):

$$\tilde{m}_1' \cong A' P_n D \tilde{M}_1 \quad \text{Formula (2);}$$

In Formula (2), $\tilde{M}_1$ is identical to $\tilde{M}_1$ in Formula (1), $\tilde{m}_1'$ is coordinates of $\tilde{M}_1$ transformed into the target virtual viewpoint image in the homogeneous coordinate system; A' is an internal parameter matrix of a target viewpoint camera (i.e., the 3# camera); and D is an external parameter matrix of the target viewpoint camera, including a rotation matrix R and a translation vector t.

The pixels in the second reference viewpoint image can be mapped into the three-dimension space by being transformed in Formula (3):

$$\tilde{m}_2 \cong A_2 P_n \tilde{M}_2 \quad \text{Formula (3);}$$

In Formula (3), $\tilde{m}_2$ is coordinates, in the image coordinate system, of a pixel in the second reference viewpoint image in the homogeneous coordinate system, $M_2$ is coordinates, in the three-dimension space coordinate system, of the pixel transformed into the three-dimension space in the homogeneous coordinate system; $A_2$ is a corresponding internal parameter matrix of the 4# camera; and $P_n$ is the normalized perspective projection matrix.

The pixels of the second reference viewpoint image mapped into the three-dimension space can be re-projected onto a target virtual viewpoint image by being transformed in Formula (4):

$$\tilde{m}_2' \cong A' P_n D \tilde{M}_2 \quad \text{Formula (4);}$$

In Formula (4), $M_2$ is identical to $M_2$ in Formula (3), $m_2'$ is coordinates of $\tilde{M}_2$ transformed into the target virtual viewpoint image, i.e., the second virtual viewpoint image, in the homogeneous coordinate system; A' is an internal parameter matrix of the target viewpoint camera (i.e., the 3# camera); and D is the external parameter matrix of the target viewpoint camera, including the rotation matrix R and the translation vector t.

A process of mapping the pixels in the reference viewpoint image into the target virtual viewpoint image is a multi-to-one process, so two or more pixels at different locations in the reference viewpoint image may be mapped to the same location in the target virtual viewpoint image and thus overlap with each other. Thus in the step c1 and the step c2, overlapping can be avoided through Z-fuffer, that is, in a process of drawing the target virtual viewpoint image, a corresponding buffer is provided for each pixel k in the target virtual viewpoint image to retain depth values of multiple pixels, from the reference viewpoint image, mapped to the pixel k, and the depth of the pixel with the highest depth value among the multiple pixels is determined as the depth of the pixel k.

A pixel in the reference viewpoint image may be transformed and then projected onto the plane of the target virtual viewpoint image by being projected onto a fractional pixel instead of a full pixel, so the integer section of the coordinates of the fractional pixel needs to be extracted as the coordinate values of a corresponding point in the target virtual viewpoint image.

In the step 102 of the foregoing flow, filling the small holes of the first virtual viewpoint image includes: determining from the value of a pixel in the hole map of the first virtual viewpoint image whether there is a hole at a corresponding location in the first virtual viewpoint image, particularly for a point with a pixel value of 0 in the hole map of the first virtual viewpoint image, there is a hole at a corresponding location in the first virtual viewpoint image; and for a point m1 with a pixel value of 0 in the hole map, a point n1 with the highest depth value is determined among horizontal, vertical and diagonal boundary points at the corresponding location in the depth image of the first virtual viewpoint image; and the point m1 is assigned with pixel information of the point n1 in the first virtual viewpoint image; and Filling the small holes of the second virtual viewpoint image includes: determining from the value of a pixel in the hole map of the second virtual viewpoint image whether there is a hole at a corresponding location in the second virtual viewpoint image, particularly for a point with a pixel value of 0 in the hole map of the second virtual viewpoint image, there is a hole at a corresponding location in the second virtual viewpoint image; and for a point m2 with a pixel value of 0 in the hole map, a point n2 with the highest depth value is determined among horizontal, vertical and diagonal boundary points at the corresponding location in the depth image of the second virtual viewpoint image; and the point m2 is assigned with pixel information of the point n2 in the second virtual viewpoint image.

The step 103 of the foregoing flow may include: the location of a hole in the first virtual viewpoint image is determined according to the hole map of the first virtual viewpoint image, where before the location of a hole in the first virtual viewpoint image is determined according to the hole map of the first virtual viewpoint image, morphologic expansion is performed on the hole map of the first virtual viewpoint image to avoid a ghost from occurring in the first virtual viewpoint image;

the location of a hole in the second virtual viewpoint image is determined according to the hole map of the second virtual viewpoint image, where before the location of a hole in the second virtual viewpoint image is determined according to the hole map of the second virtual viewpoint image, morphologic expansion is performed on the hole map of the second virtual viewpoint image to avoid a ghost from occurring in the second virtual viewpoint image;

for a pixel at each hole location in the first virtual viewpoint image, if there is a value of the pixel point in the second virtual viewpoint image, then the pixel is assigned with the value; and for a pixel at each hole location in the second virtual viewpoint image, if there is a value of the pixel point in the first virtual viewpoint image, then the pixel is assigned with the value.

In the step 104 of the foregoing flow, the fusion processing can be performed on the first virtual viewpoint image and the second virtual viewpoint image as follows: distance based image fusion is performed on the image-complemented first virtual viewpoint image and second virtual viewpoint image to obtain the primary virtual viewpoint image. Distance based image fusion can be performed on the image-complemented first virtual viewpoint image and second virtual viewpoint image in Formula (5):

$$I_v(u, v) = (1 - \alpha)I_L(u, v) + \alpha I_R(u, v),$$ Formula (5)

where $$\alpha = \frac{|t_v - t_L|}{\|t_v - t_L\| + |t_v - t_R|};$$

In Formula (5), $I_v(u, v)$ is a pixel value at the coordinates (u,v) in the primary virtual viewpoint image, $I_L$ is the image-complemented first virtual viewpoint image, $I_R$ is the image-complemented second virtual viewpoint image, $t_v$ is a translation vector of an external parameter matrix of the pixel value at the coordinates (u,v) in the primary virtual viewpoint image, $t_L$ is a translation vector of an external parameter matrix of a pixel value, in the first virtual viewpoint image, corresponding to the pixel value at the coordinates (u,v) in the primary virtual viewpoint image, and $t_R$ is a translation vector of an external parameter matrix of a pixel value, in the second virtual viewpoint image, corresponding to the pixel value at the coordinates (u,v) in the primary virtual viewpoint image.

In the step 105 of the foregoing flow of the method, depth image processing is performed respectively on the first reference viewpoint image and the second reference viewpoint image by performing bilateral filtering processing respectively on the depth image of the first reference viewpoint image and the depth image of the second reference viewpoint image.

In order to facilitate understanding of the technical solution of the invention by those skilled in the art, in an embodiment of the invention, taking a multi-viewpoint video including 8 viewpoints as an example, there is a video sequence, for example, including 8 viewpoints, each two of which are spaced horizontally by approximately 20 cm, and relevant parameters of a camera are known, where the resolution of a viewpoint based depth image of the camera is the same as that of a color image, both of which can be 1026×768; and viewpoint transformation is performed with the 2# camera (i.e., the second camera) and the 4# camera (i.e., the fourth camera) being reference viewpoints, and the 3# camera (i.e., the third camera) being a target virtual viewpoint. The 2# camera can provide the first reference viewpoint image as illustrated in FIG. 3A, and the 4# camera can provide the second reference viewpoint image as illustrated in FIG. 3C.

Figure 3A:
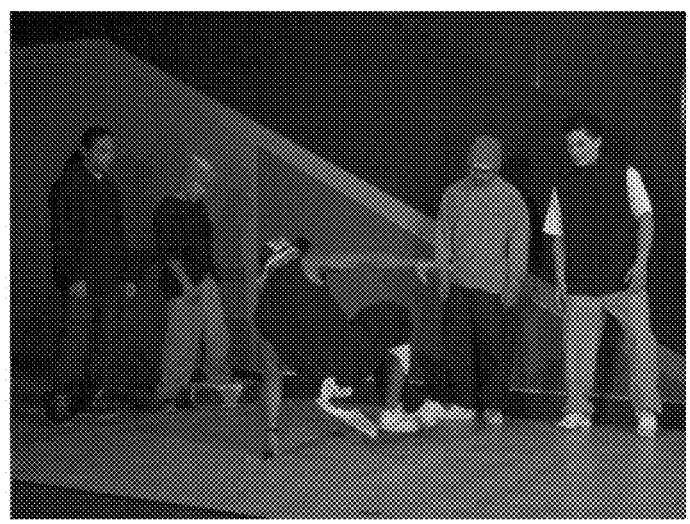
FIG. 3A is a first reference viewpoint image in an embodiment of the invention.
Figure 3B:
FIG. 3B is a depth image of the first reference viewpoint image in the embodiment of the invention.
Figure 3C:
FIG. 3C is a second reference viewpoint image in the embodiment of the invention.
Figure 3D:
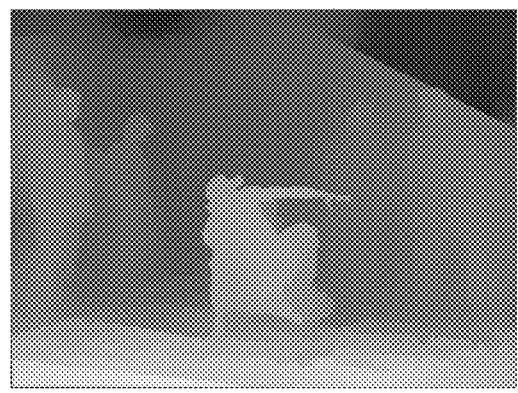
FIG. 3D is a depth image of the second reference viewpoint image in the embodiment of the invention.
Figure 4A:
FIG. 4A is the transformed three-dimension image of the first reference viewpoint image in the embodiment of the invention.
Figure 4B:
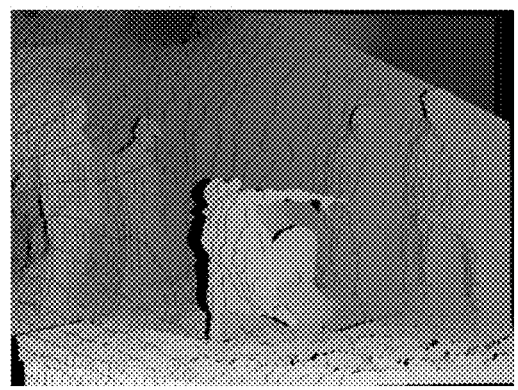
FIG. 4B is a depth image of a first virtual viewpoint image in the embodiment of the invention.
Figure 4C:
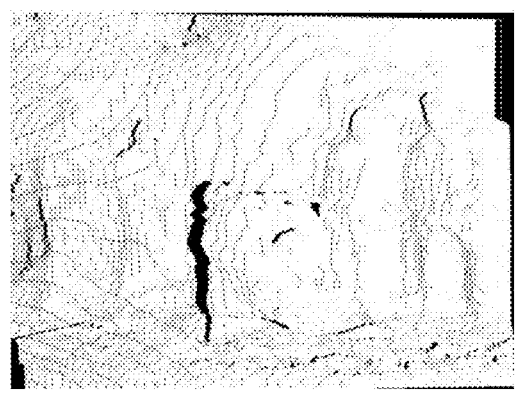
FIG. 4C is a hole map of the first virtual viewpoint image in the embodiment of the invention.
Figure 4D:
FIG. 4D is the transformed three-dimension image of the second reference viewpoint image in the embodiment of the invention.
Figure 4E:
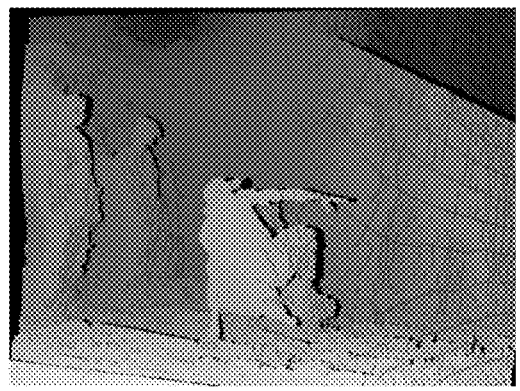
FIG. 4E is a depth image of a second virtual viewpoint image in the embodiment of the invention.
Figure 4F:
FIG. 4F is a hole map of the second virtual viewpoint image in the embodiment of the invention.

After three-dimension image transformation is performed on the first reference viewpoint image illustrated in FIG. 3A (the depth image of the first reference viewpoint image is as illustrated in FIG. 3B) and the second reference viewpoint image illustrated in FIG. 3C (the depth image of the second reference viewpoint image is as illustrated in FIG. 3D) in the step 101, the first virtual viewpoint image, the depth image and the hole map corresponding to the first reference viewpoint image (as illustrated in FIG. 4A, FIG. 4B and FIG. 4C respectively) can be obtained, and the second virtual viewpoint image, the depth image and the hole map corresponding to the second reference viewpoint image (as illustrated in FIG. 4D, FIG. 4E and FIG. 4F respectively) can be obtained.

Figure 5A:
FIG. 5A is the small holes-filled first virtual viewpoint image in the embodiment of the invention.
Figure 5B:
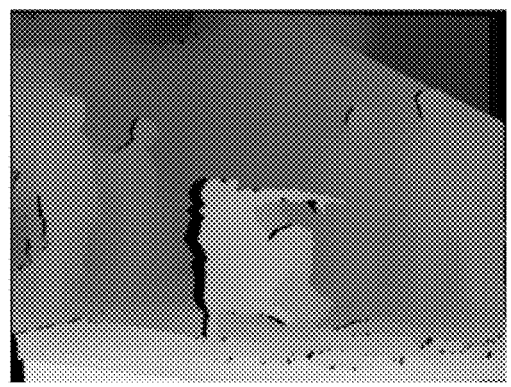
FIG. 5B is a depth image of the small holes-filled first virtual viewpoint image in the embodiment of the invention.
Figure 5C:
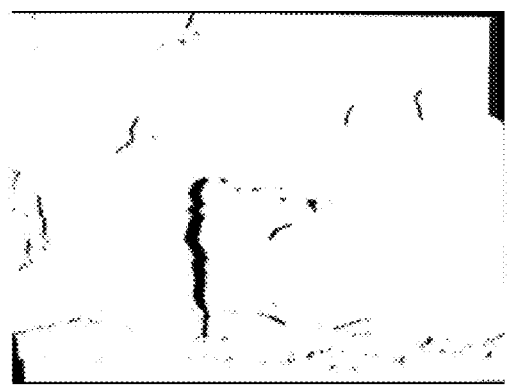
FIG. 5C is a hole map of the small holes-filled first virtual viewpoint image in the embodiment of the invention.
Figure 5D:
FIG. 5D is the small holes-filled second virtual viewpoint image in the embodiment of the invention.
Figure 5E:
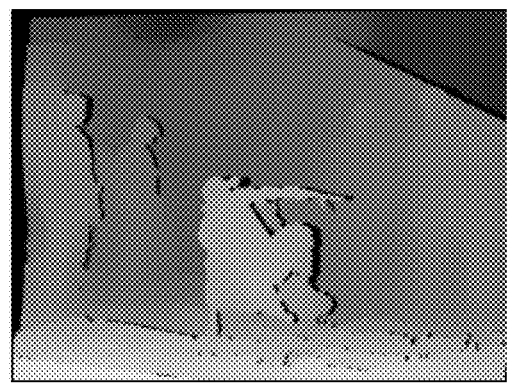
FIG. 5E is a depth image of the small holes-filled second virtual viewpoint image in the embodiment of the invention.
Figure 5F:
FIG. 5F is a hole map of the small holes-filled second virtual viewpoint image in the embodiment of the invention.

With the step 102, after the small holes of the first virtual viewpoint image and the second virtual viewpoint image illustrated in FIG. 4A and FIG. 4D, the depth images illustrated in FIG. 4B and FIG. 4E, and the hole maps illustrated in FIG. 4C and FIG. 4F are filled respectively, the small hole-filled first virtual viewpoint image as illustrated in FIG. 5A and its depth image (as illustrated in FIG. 5B) and hole map (as illustrated in FIG. 5C), and small hole-filled second virtual viewpoint image as illustrated in FIG. 5D and its depth image (as illustrated in FIG. 5E) and hole map (as illustrated in FIG. 5F) are obtained.

Figure 6A:
FIG. 6A is the image-complemented first virtual viewpoint image in the embodiment of the invention.
Figure 6B:
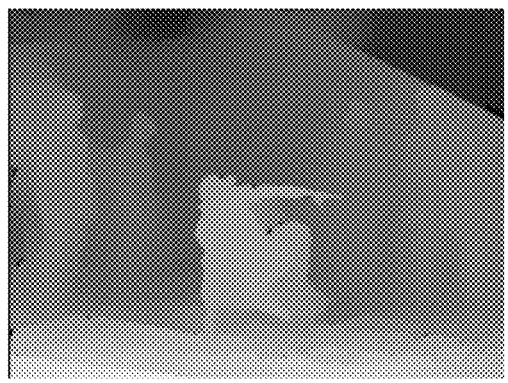
FIG. 6B is an image-complemented depth image in the embodiment of the invention.
Figure 6C:
FIG. 6C is the image-complemented second virtual viewpoint image in the embodiment of the invention.
Figure 6D:
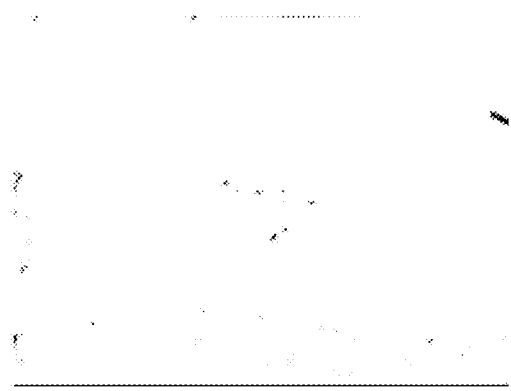
FIG. 6D is an image-complemented hole map in the embodiment of the invention.

With the step 103, after image complementing is performed on the first virtual viewpoint image and the second virtual viewpoint image as illustrated in FIG. 5A and FIG. 5D, and on the depth images as illustrated in FIG. 5B and FIG. 5E, the image-complemented first virtual viewpoint image as illustrated in FIG. 6A, depth image as illustrated in FIG. 6B, the image-complemented second virtual viewpoint image as illustrated in FIG. 6C and hole map as illustrated in FIG. 6D are obtained.

Figure 7A:
FIG. 7A is a primary virtual viewpoint image as a result of fusion processing on the image-complemented first virtual viewpoint image and second virtual viewpoint image in the embodiment of the invention.
Figure 7B:
FIG. 7B is a primary hole map as a result of fusion processing on the image-complemented hole map of the first virtual viewpoint image and the image-complemented hole map of the second virtual viewpoint image in the embodiment of the invention.

With the step 104, after fusion processing is performed on the image-complemented first virtual viewpoint image as illustrated in FIG. 6A and the image-complemented second virtual viewpoint image as illustrated in FIG. 6C, and the image-complemented depth image as illustrated in FIG. 6B and hole map as illustrated in FIG. 6D, the primary virtual viewpoint image as illustrated in FIG. 7A and the primary depth image as illustrated in FIG. 7B are obtained respectively.

Figure 8:
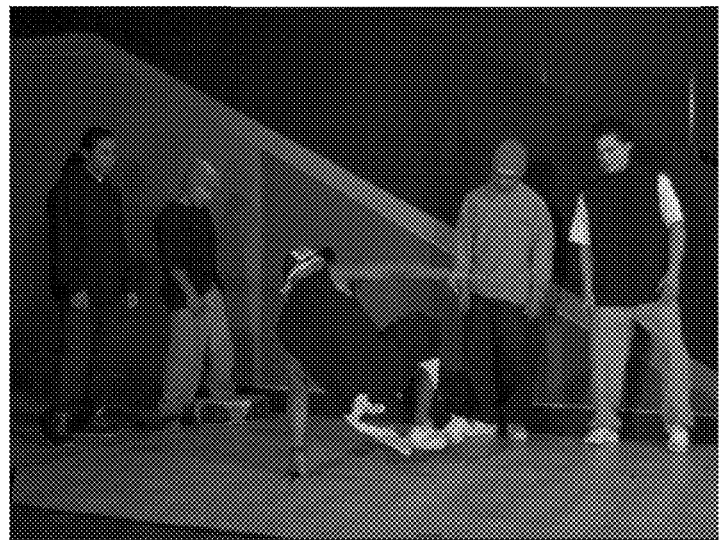
FIG. 8 is a virtual viewpoint image after filling holes of the primary virtual viewpoint image according to a secondary virtual viewpoint image in the embodiment of the invention.

With the step 106, after the small holes of the primary virtual viewpoint image are filled according to the secondary virtual viewpoint image, the virtual viewpoint image as illustrated in FIG. 8 can be obtained.

Figure 9:
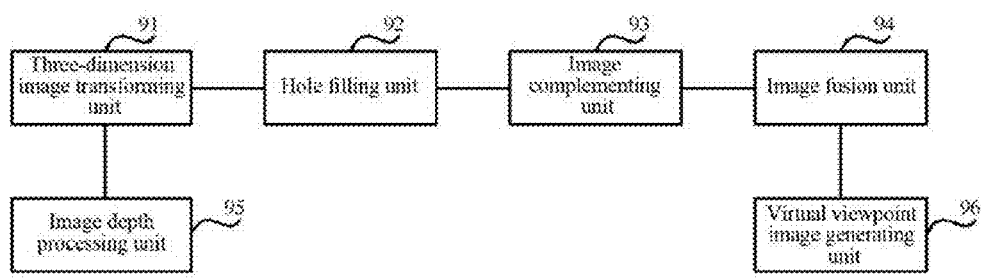
FIG. 9 is a schematic structural diagram of an apparatus for virtual viewpoint synthesis in a multi-viewpoint video in an embodiment of the invention.

Based upon the same idea as the foregoing flow of the method, an embodiment of the invention further provides an apparatus for virtual viewpoint synthesis in a multi-viewpoint video, and a structure of the apparatus is as illustrated in FIG. 9.

Referring to FIG. 9, which is a schematic structural diagram of the apparatus for virtual viewpoint synthesis in a multi-viewpoint video, the apparatus may include:

A three-dimension image transforming unit 91 configured to perform three-dimension image transformation on a first reference viewpoint image obtained by a first camera according to the first reference viewpoint image and its depth image, and parameters of the first camera to obtain a first virtual viewpoint image and its depth image and hole map; and to perform three-dimension image transformation on a second reference viewpoint image obtained by a second camera according to the second reference viewpoint image and its depth image, and parameters of the second camera to obtain a second virtual viewpoint image and its depth image and hole map;

A hole filling unit 92 configured to fill small holes of the first virtual viewpoint image through horizontal, vertical and diagonal extrapolations according to the hole map of the first virtual viewpoint image to obtain the small holes-filled first virtual viewpoint image; and to fill small holes of the second virtual viewpoint image through horizontal, vertical and diagonal extrapolations according to the hole map of the second virtual viewpoint image to obtain the small holes-filled second virtual viewpoint image;

An image complementing unit 93 configured to perform image complementing by taking the small holes-filled first virtual viewpoint image and second virtual viewpoint image as reference images of each other to obtain the image-complemented first virtual viewpoint image and second virtual viewpoint image;

An image fusion unit 94 configured to perform fusion processing on the image-complemented first virtual viewpoint image and second virtual viewpoint image to obtain a primary virtual viewpoint image;

An depth image processing unit 95 configured to perform depth image processing respectively on the first reference viewpoint image and the second reference viewpoint image to obtain the depth image-processed first reference viewpoint image and second reference viewpoint image; and to trigger the three-dimension image transforming unit, the hole filling unit, the image complementing unit and the image fusion unit to sequentially perform the corresponding processes on the depth image-processed first reference viewpoint image and second reference viewpoint image to obtain a secondary virtual viewpoint image; and A virtual viewpoint image generating unit 96 configured to fill holes of the primary virtual viewpoint image according to the secondary virtual viewpoint image to generate a virtual viewpoint image.

The hole filling unit 92 is further configured:

to fill the small holes of the first virtual viewpoint image by determining from the value of a pixel in the hole map of the first virtual viewpoint image whether there is a hole at a corresponding location in the first virtual viewpoint image; for a point m1 with a pixel value of 0 in the hole map, to determine a point n1 with the highest depth value among horizontal, vertical and diagonal boundary points at the corresponding location in the depth image of the first virtual viewpoint image; and to assign the point m1 with pixel information of the point n1 in the first virtual viewpoint image; and to fill the small holes of the second virtual viewpoint image by determining from the value of a pixel in the hole map of the second virtual viewpoint image whether there is a hole at a corresponding location in the second virtual viewpoint image; for a point m2 with a pixel value of 0 in the hole map, to determine a point n2 with the highest depth value among horizontal, vertical and diagonal boundary points at the corresponding location in the depth image of the second virtual viewpoint image; and to assign the point m2 with pixel information of the point n2 in the second virtual viewpoint image.

The image complementing unit 93 is further configured to determine the location of a hole in the first virtual viewpoint image according to the hole map of the first virtual viewpoint image, and to perform morphologic expansion on the hole map of the first virtual viewpoint image to avoid a ghost from occurring in the first virtual viewpoint image;

to determine the location of a hole in the second virtual viewpoint image according to the hole map of the second virtual viewpoint image, and to perform morphologic expansion on the hole map of the second virtual viewpoint image to avoid a ghost from occurring in the second virtual viewpoint image;

for a pixel at each hole location in the first virtual viewpoint image, if there is a value of the pixel point in the second virtual viewpoint image, to assign the pixel with the value; and for a pixel at each hole location in the second virtual viewpoint image, if there is a value of the pixel point in the first virtual viewpoint image, to assign the pixel with the value.

In the embodiment of the invention, two viewpoint images provided by a first camera and a second camera are taken as reference viewpoint images, and three-dimension image transformation, small-hole filling, image complementing and image fusion processing are performed respectively on these two viewpoint images to obtain a primary virtual viewpoint image; then depth image processing, three-dimension image transformation, small-hole filling, image complementing and image fusion processing are performed respectively on the two viewpoint images to obtain a secondary virtual viewpoint image; and a virtual viewpoint image to be synthesized in the end is obtained by filling remaining holes of the primary virtual viewpoint image according to the secondary virtual viewpoint image. With the technical solution of the invention, the primary virtual viewpoint image is obtained by performing the corresponding processes on the two reference viewpoint images without any depth image processing, so no significant image distortion will result; and the secondary virtual viewpoint image is obtained by performing the corresponding processes, including depth image processing, on the two reference viewpoint images, so the difference in depth between a foreground object and a background can be alleviated and the quality of the virtual viewpoint image can be improved; and the virtual viewpoint image with a high quality can be synthesized without any distortion by filling the holes of the primary virtual viewpoint image according to the secondary virtual viewpoint image.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for virtual viewpoint synthesis in a multi-viewpoint video, comprising:
   the step 1 of performing three-dimension image transformation on a first reference viewpoint image obtained by a first camera according to the first reference viewpoint image and its depth image, and parameters of the first camera, to obtain a first virtual viewpoint image and its depth image and hole map; and performing three-dimension image transformation on a second reference viewpoint image obtained by a second camera according to the second reference viewpoint image and its depth image, and parameters of the second camera, to obtain a second virtual viewpoint image and its depth image and hole map;
   the step 2 of filling small holes of the first virtual viewpoint image through horizontal, vertical and diagonal extrapolations according to the hole map of the first virtual viewpoint image, to obtain the small holes-filled first virtual viewpoint image; and filling small holes of the second virtual viewpoint image through horizontal, vertical and diagonal extrapolations according to the hole map of the second virtual viewpoint image, to obtain the small holes-filled second virtual viewpoint image;
   the step 3 of performing image complementing by taking the small holes-filled first virtual viewpoint image and second virtual viewpoint image as reference images of each other, to obtain the image-complemented first virtual viewpoint image and second virtual viewpoint image;
   the step 4 of performing fusion processing on the image-complemented first virtual viewpoint image and second virtual viewpoint image, to obtain a primary virtual viewpoint image;
   the step 5 of performing depth image processing respectively on the first reference viewpoint image and the second reference viewpoint image, to obtain the depth image-processed first reference viewpoint image and second reference viewpoint image; and then performing the corresponding processes on the depth image-processed first reference viewpoint image and second reference viewpoint image according to the step 1 to the step 4, to obtain a secondary virtual viewpoint image; and
   the step 6 of filling holes of the primary virtual viewpoint image according to the secondary virtual viewpoint image to generate a virtual viewpoint image.

2. The method according to claim 1, wherein performing three-dimension image transformation on the first reference viewpoint image in the step 1 comprises:
   the step a1 of mapping pixels in the first reference viewpoint image into a three-dimension space;
   the step b1 of re-projecting the pixels mapped into the three-dimension space in the step a1 onto the first virtual viewpoint image; and
   the step c1 of screening coordinate values of the pixels in the first virtual viewpoint image through Z-fuffer and rounding method;
   and wherein performing three-dimension image transformation on the second reference viewpoint image in the step 1 comprises:
   the step a2 of mapping pixels in the second reference viewpoint image into the three-dimension space;
   the step b2 of re-projecting the pixels mapped into the three-dimension space in the step a2 onto the second virtual viewpoint image; and
   the step c2 of screening coordinate values of the pixels in the second virtual viewpoint image through Z-fuffer and rounding method.

3. The method according to claim 2, wherein:
   in the step a1, the step b1 and the step c1, coordinate points of the pixels in the first reference viewpoint image are located in an image coordinate system with the upper left of the first reference viewpoint image being the origin, the horizontal direction being the abscissa and the vertical direction being the ordinate; and in the step a2, the step b2 and the step c2, coordinate points of the pixels in the second reference viewpoint image are located in an image coordinate system with the upper left of the second reference viewpoint image being the origin, the horizontal direction being the abscissa and the vertical direction being the ordinate; and
   a space coordinate system of the three-dimension space has the bottom left of a screen being the origin, and the vertical direction of the screen plane being the x axis of the space coordinate system and the horizontal direction of the screen plane being the y axis thereof.

4. The method according to claim 1, wherein filling the small holes of the first virtual viewpoint image comprises: determining from the value of a pixel in the hole map of the first virtual viewpoint image whether there is a hole at a corresponding location in the first virtual viewpoint image; and for a point m1 with a pixel value of 0 in the hole map, determining a point n1 with the highest depth value among horizontal, vertical and diagonal boundary points at the corresponding location in the depth image of the first virtual viewpoint image; and assigning the point m1 with pixel information of the point n1 in the first virtual viewpoint image; and
   filling the small holes of the second virtual viewpoint image comprises: determining from the value of a pixel in the hole map of the second virtual viewpoint image whether there is a hole at a corresponding location in the second virtual viewpoint image; and for a point m2 with a pixel value of 0 in the hole map, determining a point n2 with the highest depth value among horizontal, vertical and diagonal boundary points at the corresponding location in the depth image of the second virtual viewpoint image; and assigning the point m2 with pixel information of the point n2 in the second virtual viewpoint image.

5. The method according to claim 1, wherein the step 3 comprises:
   determining the location of a hole in the first virtual viewpoint image according to the hole map of the first virtual viewpoint image; and performing morphologic expansion on the hole map of the first virtual viewpoint image;
   determining the location of a hole in the second virtual viewpoint image according to the hole map of the second virtual viewpoint image; and performing morphologic expansion on the hole map of the second virtual viewpoint image;
   for a pixel at each hole location in the first virtual viewpoint image, if there is a value of the pixel point in the second virtual viewpoint image, then assigning the pixel with the value; and for a pixel at each hole location in the second virtual viewpoint image, if there is a value of the pixel point in the first virtual viewpoint image, then assigning the pixel with the value.

6. The method according to claim 1, wherein the step 4 comprises:
performing distance based image fusion on the image-complemented first virtual viewpoint image and second virtual viewpoint image to obtain the primary virtual viewpoint image.

7. The method according to claim 1, wherein performing depth image processing respectively on the first reference viewpoint image and the second reference viewpoint image in the step 5 comprises:
performing bilateral filtering processing respectively on the depth image of the first reference viewpoint image and the depth image of the second reference viewpoint image.

8. An apparatus for virtual viewpoint synthesis in a multi-viewpoint video, comprising:
a three-dimension image transforming unit configured to perform three-dimension image transformation on a first reference viewpoint image obtained by a first camera according to the first reference viewpoint image and its depth image, and parameters of the first camera to obtain a first virtual viewpoint image and its depth image and hole map; and to perform three-dimension image transformation on a second reference viewpoint image obtained by a second camera according to the second reference viewpoint image and its depth image, and parameters of the second camera to obtain a second virtual viewpoint image and its depth image and hole map;
a hole filling unit configured to fill small holes of the first virtual viewpoint image through horizontal, vertical and diagonal extrapolations according to the hole map of the first virtual viewpoint image to obtain the small holes-filled first virtual viewpoint image; and to fill small holes of the second virtual viewpoint image through horizontal, vertical and diagonal extrapolations according to the hole map of the second virtual viewpoint image to obtain the small holes-filled second virtual viewpoint image;
an image complementing unit configured to perform image complementing by taking the small holes-filled first virtual viewpoint image and second virtual viewpoint image as reference images of each other to obtain the image-complemented first virtual viewpoint image and second virtual viewpoint image;
an image fusion unit configured to perform fusion processing on the image-complemented first virtual viewpoint image and second virtual viewpoint image to obtain a primary virtual viewpoint image;
an depth image processing unit configured to perform depth image processing respectively on the first reference viewpoint image and the second reference viewpoint image to obtain the depth image-processed first reference viewpoint image and second reference viewpoint image; and to trigger the three-dimension image transforming unit, the hole filling unit, the image complementing unit and the image fusion unit to sequentially perform the corresponding processes on the depth image-processed first reference viewpoint image and second reference viewpoint image to obtain a secondary virtual viewpoint image; and
a virtual viewpoint image generating unit configured to fill holes of the primary virtual viewpoint image according to the secondary virtual viewpoint image to generate a virtual viewpoint image.

9. The apparatus according to claim 8, wherein the hole filling unit is further configured:
to fill the small holes of the first virtual viewpoint image by determining from the value of a pixel in the hole map of the first virtual viewpoint image whether there is a hole at a corresponding location in the first virtual viewpoint image; for a point m1 with a pixel value of 0 in the hole map, to determine a point n1 with the highest depth value among horizontal, vertical and diagonal boundary points at the corresponding location in the depth image of the first virtual viewpoint image; and to assign the point m1 with pixel information of the point n1 in the first virtual viewpoint image; and
to fill the small holes of the second virtual viewpoint image by determining from the value of a pixel in the hole map of the second virtual viewpoint image whether there is a hole at a corresponding location in the second virtual viewpoint image; for a point m2 with a pixel value of 0 in the hole map, to determine a point n2 with the highest depth value among horizontal, vertical and diagonal boundary points at the corresponding location in the depth image of the second virtual viewpoint image; and to assign the point m2 with pixel information of the point n2 in the second virtual viewpoint image.

10. The apparatus according to claim 8, wherein the image complementing unit is further configured to determine the location of a hole in the first virtual viewpoint image according to the hole map of the first virtual viewpoint image, and to perform morphologic expansion on the hole map of the first virtual viewpoint image;
to determine the location of a hole in the second virtual viewpoint image according to the hole map of the second virtual viewpoint image, and to perform morphologic expansion on the hole map of the second virtual viewpoint image;
for a pixel at each hole location in the first virtual viewpoint image, if there is a value of the pixel point in the second virtual viewpoint image, to assign the pixel with the value; and
for a pixel at each hole location in the second virtual viewpoint image, if there is a value of the pixel point in the first virtual viewpoint image, to assign the pixel with the value.

* * * * *